United States Patent [19]

Kendrena

[11] 4,082,304
[45] Apr. 4, 1978

[54] SKI-SLED

[76] Inventor: Carl M. Kendrena, 701 W. Windsor Ave., Phoenix, Ariz. 85007

[21] Appl. No.: 761,530

[22] Filed: Jan. 24, 1977

[51] Int. Cl.² .............................................. B62B 13/10
[52] U.S. Cl. ................................ 280/12 KL; 9/310 C;
   280/16; 280/17; D12/8
[58] Field of Search ............ 280/12 K, 12 KL, 12 L,
   280/21 R, 21 A, 22, 15, 16, 17, 7.15; 9/310 B,
   310 C; D12/8, 9

[56] References Cited

U.S. PATENT DOCUMENTS

| 1,655,713 | 1/1928 | Scoville | 280/12 K |
| 2,043,374 | 6/1936 | Gelbman | 280/21 R |
| 2,247,182 | 6/1941 | Bosca | 280/12 KL |
| 2,477,699 | 8/1949 | Magun | 280/12 KL |
| 2,963,299 | 12/1960 | Smith | 280/12 K |
| 3,139,287 | 6/1964 | Annis | 280/21 R |

FOREIGN PATENT DOCUMENTS 945,594  4/1974  Canada ............................ 280/21 R Primary Examiner—Joseph F. Peters, Jr.
Assistant Examiner—Michael J. Forman
Attorney, Agent, or Firm—Herbert E. Haynes, Jr.

[57] ABSTRACT

A ski-sled including an elongated ski-like runner that carries a seat and is equipped with control runners extending from the forward end thereof. The control runners are pivotably movable relative to the ski-like runner for steering purposes and are hingedly interconnected to provide stability.

5 Claims, 4 Drawing Figures

SKI-SLED

BACKGROUND OF THE INVENTION

1. Field of the Invention

This invention relates to recreational and sports equipment and more particularly to a combination ski-sled mechanism.

2. Description of the Prior Art

Several attempts have been made to devise a sled-like coasting structure for carrying a seated rider on a single elongated ski runner. A typical one of these prior art devices is disclosed in U.S. Pat. No. 2,963,299 issued December, 1960 to W. W. Smith. These prior art devices have not proven to be commercially successful apparently due to the difficulty that a seated rider experiences in balancing, steering and otherwise controlling such an inherently unstable structure.

SUMMARY OF THE INVENTION

In accordance with the present invention, a new and useful ski-sled mechanism is disclosed for use in recreational and sporting activities such as coasting down a ski slope. The ski-sled mechanism includes an elongated main ski-like runner having a seat thereon and having control/stabilizing runners extending from the forward end of the main runner.

The control/stabilizing runners comprise a central guide runner and an oppositely disposed pair of outrigger runners, all of which are parallel with respect to each other and are hingedly interconnected so that each are independent to move vertically and roll about their respective longitudinal axes without disturbing the parallel relationship. The central guide runner has its rearmost end pivotably connected to the forward end of the main runner so that all of the control/stabilizing runners may be pivoted about an axis which is perpendicular with respect to the main and the control/stabilizing runners.

With a rider seated on the ski-sled mechanism and his feet placed atop the outrigger runners he may maintain the balance and steer the ski-sled mechanism by appropriate foot and leg movements.

Accordingly, it is an object of the present invention to provide a new and useful ski-sled mechanism.

Another object of the present invention is to provide a new and useful ski-sled mechanism for carrying a seated rider down a ski slope.

Another object of the present invention is to provide a new and useful ski-sled mechanism which is inexpensive to manufacture, simple to use, and which affords a safe vehicle for carrying a seated rider down snow slopes.

Another object of the present invention is to provide a new and useful ski-sled mechanism of the above described character which includes an elongated main runner having a raised seat thereon and which is provided with control/stabilizing runners by which a rider may balance and steer the ski-sled mechanism.

The foregoing and other objects of the present invention, as well as the invention itself, may be more fully understood from the following description when read in conjunction with the accompanying drawings.

DESCRIPTION OF THE PREFERRED EMBODIMENT

Figure 1:
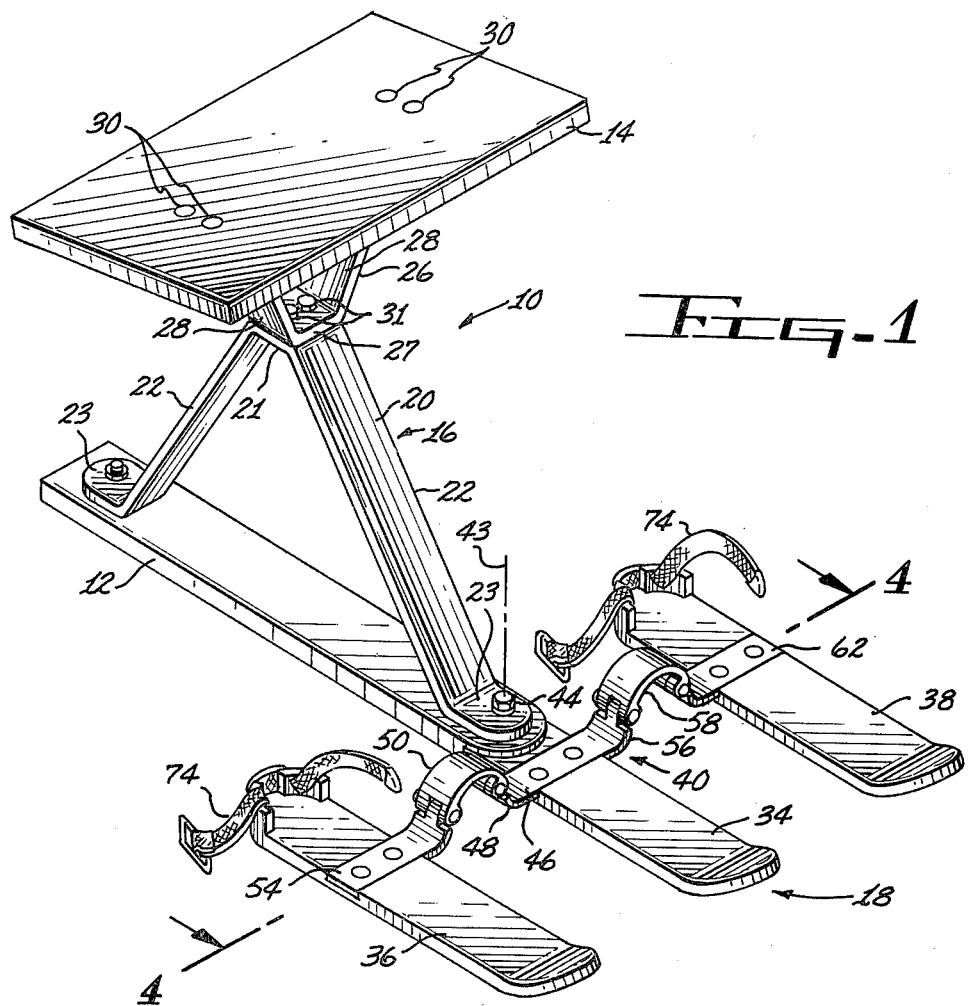
FIG. 1 is an isometric view of the ski-sled mechanism of the present invention illustrating the various features thereof.
Figure 2:
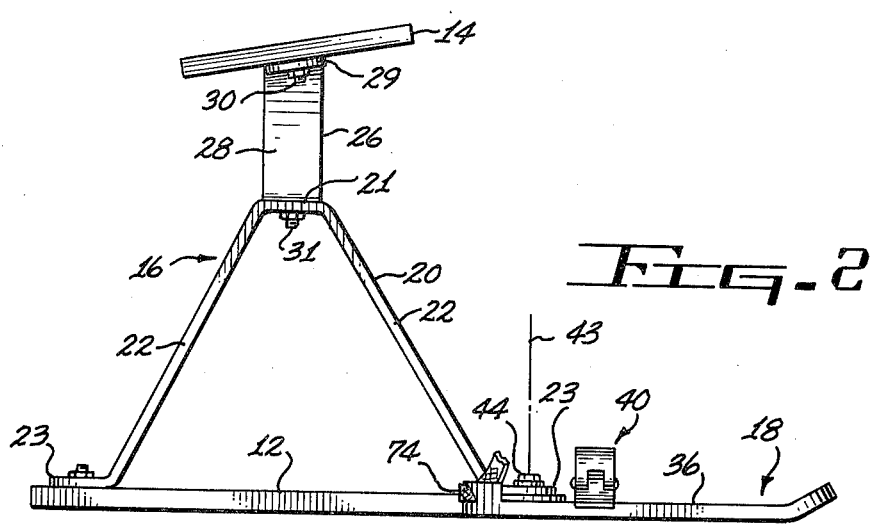
FIG. 2 is a side elevational view of the ski-sled mechanism of the present invention.

Referring more particularly to the drawings, FIGS. 1 and 2 show the ski-sled mechanism of the present invention which is indicated generally by the reference numeral 10. As will hereinafter be described in detail, the ski-sled mechanism 10 includes an elongated main runner 12 upon which a suitable seat 14 is carried atop a support structure 16. A control/stabilizing runner assembly, indicated generally by the reference numeral 18, is connected to the foward end of the main runner 12 in a manner which allows a rider (not shown) to balance and steer the ski-sled mechanism.

The elongated main runner 12 is intended to be of a suitable configuration which will provide proper support for the seat 14, seat supporting structure 16, and a rider (not shown), with the runner 12 preferrably being similar to a conventional ski as far as the width and thickness dimensions are concerned, and being somewhat shorter in length than a conventional ski.

The seat supporting structure 16 is shown as including a lower strap member 20 formed of suitable material such as metal which is configured into an inverted V-shape to provide a flat 21 from the opposite ends of which a pair of legs 22 divergingly depend. The lower end of each of the diverging legs 22 has a mounting pad or flange 23 formed thereon, and those pads 23 are adapted for suitable connection to the opposite ends of the main runner 12. Seat support 16 further includes an upper strap member 26 configured to provide a flat 27 from the opposite ends of which a pair of diverging legs 28 upwardly extend. The upper end of each of the legs 28 is provided with a mounting pad 29 (one shown) formed thereon, for attachment to the lower surface of the seat 14 such as with suitable bolts 30.

Optimum weight distribution and seat supporting characteristics are achieved by mounting the lower strap member 20 so that the spaced apart mounting pads 23 thereof lie along the longitudinal axis of the main runner 12, and attaching the flat 27 of the upper strap member 26, such as with bolts 31, to the flat 21 of the lower strap member 20 in a manner which positions the mounting pads 29 (one shown) of the upper strap member 26 to lie along a line which is transverse to the longitudinal axis of the main runner 12.

The control/stabilizing runner assembly 18 comprises a centrally located guide runner 34 and an oppositely disposed pair of outrigger runners 36 and 38, with those runners 34, 36, and 38 being interconnected by hinge means 40.

Figure 3:
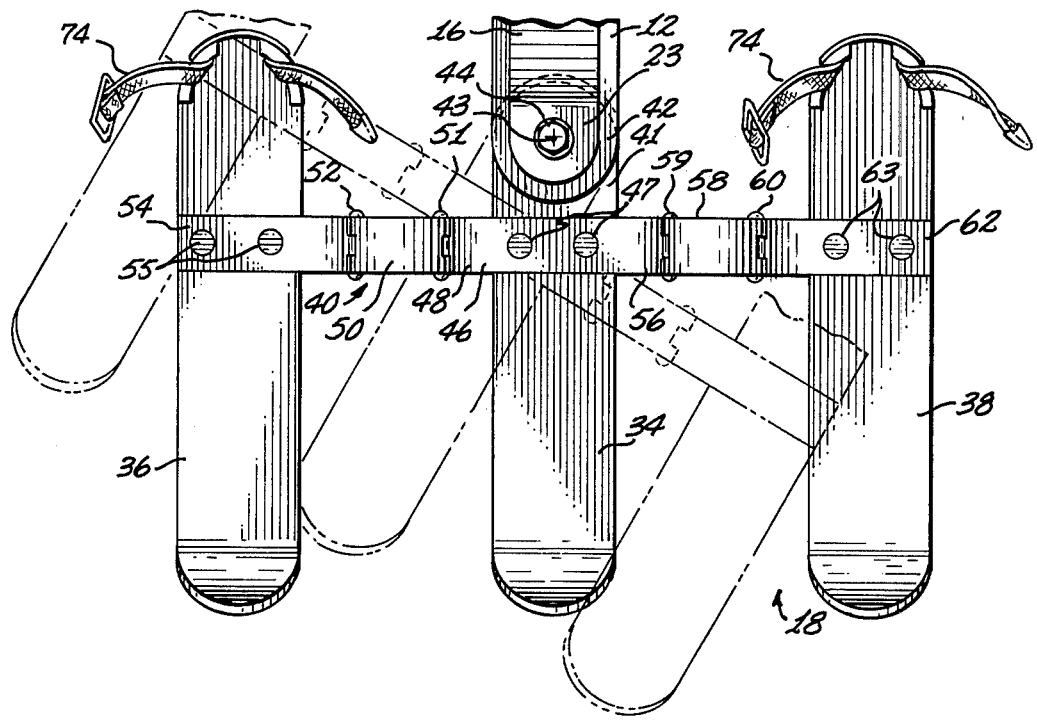
FIG. 3 is an enlarged fragmentary plan view illustrating the control/stabilizing runners of the ski-sled mechanism of the present invention.

As seen best in FIG. 3, the outrigger runners 36 and 38 are each disposed and laterally spaced from a different one of the opposite sides of the guide runner 34 and are parallel with respect to the guide runner and to each other. The rearwardly disposed end 41 of the guide runner 34 is coupled to the forward end 42 of the main runner 12 so as to be pivotably movable about a pivot axis 43 which passes through a suitable bolt 44. As seen best in FIG. 1, the pivot axis 43 is perpendicular with respect to the main runner 12 and the guide runner 34.

The hinge means 40, which will hereinafter be described, interconnects the guide and outrigger runners 34, 36, and 38 so that pivotal movement of the guide runner 34 about the pivot axis 43 will cause the outrigger runners 36 and 38 to move in unison therewith without disturbing the parallel relationship. Such movement is employed for steering of the ski-sled mechanism 10 and is illustrated in FIG. 3 wherein one position of the control/stabilizing runner assembly 18 is shown in solid lines and another position is shown in dashed lines.

The hinge means 40 includes a first strap 46 which is transverse to the guide runner 34 and is affixed thereto such as by flush rivets 47. One end 48 of the first strap 46, which transversely extends toward the outrigger runner 36, is curved upwardly and hingedly connected to one end of a first arcuate link 50 by means of a hinge pin 51. The opposite end of the first arcuate link 50 is hingedly connected by a hinge pin 52 to the upwardly curved end of a second strap 54 which is transversely affixed to the outrigger runner 36 such as with flush rivets 55. The opposite end 56 of the first strap 46, which transversely extends from the guide runner 34 toward the outrigger runner 38, is curved upwardly for hinged connection to one end of a second arcuate link 58 by means of a hinge pin 59. The opposite end of the second arcuate link 58 is hingedly coupled by a hinge pin 60 to the upwardly curved end of a third strap 62 which is transversely affixed to the outrigger runner 38 such as with flush rivets 63.

It will now be seen that the hinge means 40 as described above, provides a double hinged interconnection of the guide and outrigger runners 34, 36, and 38, i.e., the outrigger runner 36 is coupled to the guide runner 34 by a double hinge device, and the outrigger runner 38 is similarly connected to the guide runner by a double hinged interconnection.

This double hinged interconnection along with the hinge pins 51, 52, 59, and 60 being parallel to the guide and outrigger runners 34, 36, and 38 allows those runners to move independently of each other in a plane which is transverse to the longitudinal axis of the hinge pins, and is thus transverse to the outrigger and guide runners.

Figure 4:
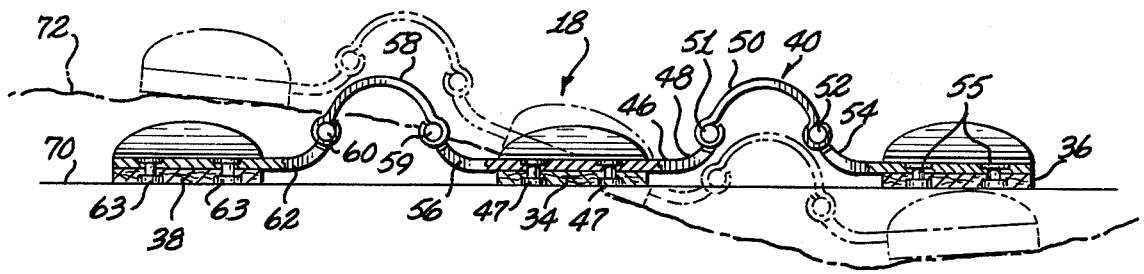
FIG. 4 is an enlarged sectional view taken on line 4—4 of FIG. 1.

The independent movements of the guide and outrigger runners 34, 36, and 38 will be more easily seen by referring to FIG. 4 wherein those runners are shown in solid lines as bearing on a substantially flat horizontal surface 70. In that same figure, the runners 34, 36, and 38 are shown in dashed lines as bearing on an irregular sloping surface 72. In accomplishing the transition between the flat surface 70 and the sloping surface 72, the guide runner 34 is seen to have been rolled about its longitudinal axis which means that the entire ski-sled mechanism 10 is in a leaning attitude. In that same transition, the outrigger 36 has hingedly moved so as to be vertically disposed below the guide runner 34 and has also been hingedly moved so that its planar surfaces are angularly disposed with respect to the planar surfaces of the guide runner 34. Likewise, the outrigger runner 38 has been hingedly moved so as to be vertically upwardly displaced from the guide runner 34, and further hingedly moved so that its planar surfaces are angularly disposed with respect to the planar surfaces of the guide runner 34.

Each of the outrigger runners 36 and 38 may be provided with suitable straps 74 or other means for securing a rider's feet (not shown) thereon. Therefore, it will now be seen that the rider will be able to control the steering of the ski-sled 10 with suitable foot and leg movements to cause the control/stabilizing runner assembly 18 to pivot relative to the main runner 12. Further, the rider by appropriate leg action will be able to maintain balance of the ski-sled 10 by keeping the outrigger runners 36 and 38 in bearing engagement with the ground in most instances regardless of the attitude of the ski-sled 10 and regardless of the irregularities and/or slope of the ground.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A ski-sled mechanism comprising:
   a. an elongated ski-like main runner;
   b. a seat positioned above said main runner;
   c. support means extending between said main runner and said seat for interconnection thereof;
   d. a ski-like guide runner having its rearmost end pivotally connected to the forward end of said main runner for pivotal movement about a pivot axis which is perpendicular to said main runner;
   e. a pair of ski-like outrigger runners each laterally spaced from a different opposite side of said guide runner and parallel therewith; and
   f. hinge means for rigidly interconnecting said pair of outrigger runners with said guide runner for pivotal movement therewith and for hingedly interconnecting said outrigger runners and said guide runner to allow independent movements of said outrigger runners about the longitudinal axis of said guide runner.

2. A ski-sled mechanism as claimed in claim 1 wherein said support means comprises:
   a. a lower strap member configured to have a flat portion from the opposite ends of which a pair of legs divergingly depend, each of said legs having a mounting pad formed thereon for mounting said lower strap member at spaced locations along the length of said main runner;
   b. an upper strap member configured to have a flat portion from the opposite ends of which a pair of legs divergingly upwardly extend, each of said pair of upwardly diverging legs having a mounting pad formed thereon for spaced apart connection to said seat; and
   c. means for affixing the flat portion of said upper strap member to the flat portion of said lower strap member so that the mounting pads of said upper strap member lie along a line which is transverse to said main runner.

3. A ski-sled mechanism as claimed in claim 1 wherein each of said pair of outrigger runners has means thereon for receiving and attaching the foot of a rider thereon.

4. A ski-sled mechanism as claimed in claim 1 wherein said hinge means comprises:
   a. a first link hingedly connected on one end thereof to said guide runner and hingedly connected on its opposite end to one of said pair of outrigger runners; and b. a second link hingedly connected on one end thereof to said guide runner and hingedly connected on its opposite end to the other one of said pair of outrigger runners.

5. A ski-sled mechanism as claimed in claim 1 wherein said hinge means comprises:

a. a first strap transversely attached to said guide runner and having its opposite ends curved upwardly;

b. a first arcuate link hingedly connected on one of its ends to one of the ends of said first strap;

c. a second strap transversely attached to one of said outrigger runners and having one of its ends curved upwardly and hingedly connected to the opposite end of said first arcuate link;

d. a second arcuate link hingedly connected on one of its ends to the opposite end of said first strap; and e. a third strap transversely attached to the other one of said outrigger runners and having one of its ends curved upwardly and hingedly connected to the opposite end of said second arcuate link.

* * * * *